United States Patent [19]

Capuano

[11] 4,289,181
[45] Sep. 15, 1981

[54] FASTENER

[75] Inventor: Terry D. Capuano, Hinckley, Ohio

[73] Assignee: The Lamson & Sessions Co., Cleveland, Ohio

[21] Appl. No.: 26,889

[22] Filed: Apr. 4, 1979

[51] Int. Cl.³ .................................. F16B 39/282
[52] U.S. Cl. .......................................... 411/187
[58] Field of Search ............... 151/37, 35, 34, 40, 151/39

[56] References Cited

U.S. PATENT DOCUMENTS

| 80,031 | 7/1868 | Towne | 151/34 |
|---|---|---|---|
| 738,217 | 9/1903 | Love | 151/34 X |
| 827,562 | 7/1906 | Pollock et al. | 151/34 |
| 843,720 | 2/1907 | Waddell et al. | 151/34 |
| 986,510 | 3/1911 | Scott | 151/34 X |
| 1,064,792 | 6/1913 | Vance | 151/37 X |
| 1,887,616 | 11/1932 | Berge | 151/37 |
| 1,952,305 | 3/1934 | Beck | 151/37 |
| 2,779,376 | 1/1957 | Poupitch | 151/37 |
| 3,120,254 | 2/1964 | Waltermire et al. | 151/37 |
| 3,221,792 | 12/1965 | Poupitch | 151/38 |
| 3,263,727 | 8/1966 | Herpolsheimer | 151/34 |
| 3,305,987 | 2/1967 | Weaver | 151/37 X |
| 3,926,237 | 12/1975 | Enders | 151/35 X |

FOREIGN PATENT DOCUMENTS

| 2649077 | 5/1977 | Fed. Rep. of Germany | 151/35 |
|---|---|---|---|
| 2641177 | 3/1978 | Fed. Rep. of Germany | 151/37 |
| 477143 | 12/1937 | United Kingdom | 151/37 |

Primary Examiner—Ramon S. Britts
Attorney, Agent, or Firm—Yount and Tarolli

[57] ABSTRACT

An improved fastener is provided with retainer elements which are utilized to prevent undesired movement of the fastener relative to an associated member. In one embodiment of the invention, the retainer elements are resiliently deflectable spring fingers having free end portions which penetrate the associated member to prevent reverse rotation of the fastener, that is rotation of the fastener in a direction tending to loosen the fastener. When the threaded fastener is being rotated in a first direction to tighten it, the spring fingers are deflected into recesses formed in the fastener to prevent gouging or marking of the member. Upon the application of a force tending to loosen the fastener, the free end portions of the spring fingers penetrate the member and dig in to prevent loosening movement of the fastener. In another embodiment of the invention, the retainer elements cooperate with an associated member to prevent both axial and rotational movement of the fastener relative to the member. In this embodiment of the invention each of the retainer elements includes a pair of spring fingers having free end portions which penetrate the member as the fastener is pressed against the member. As the spring fingers penetrate the member, curved side surfaces on the spring fingers cam them in opposite directions to hook the spring fingers into the member.

2 Claims, 10 Drawing Figures

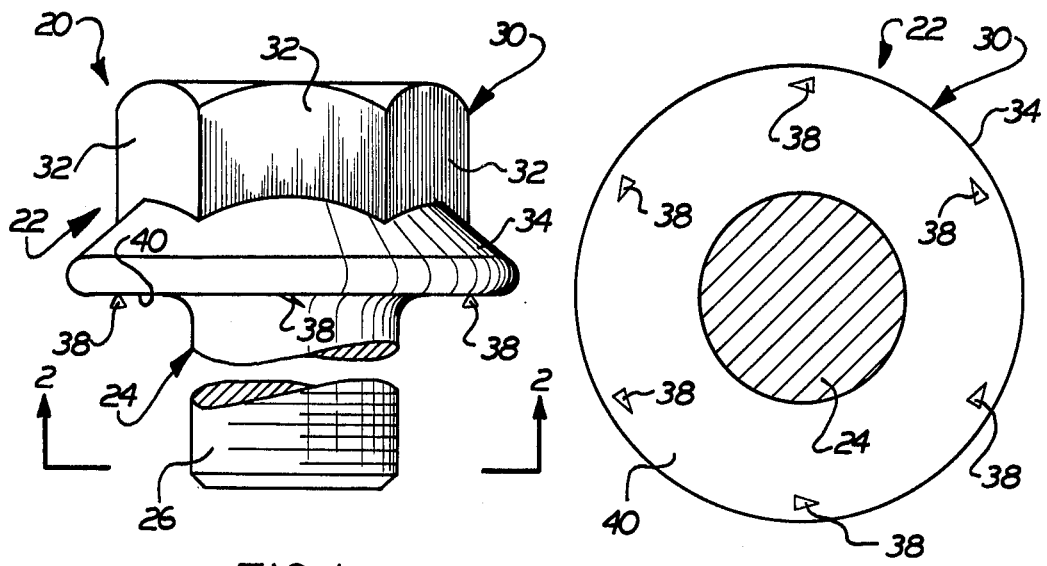
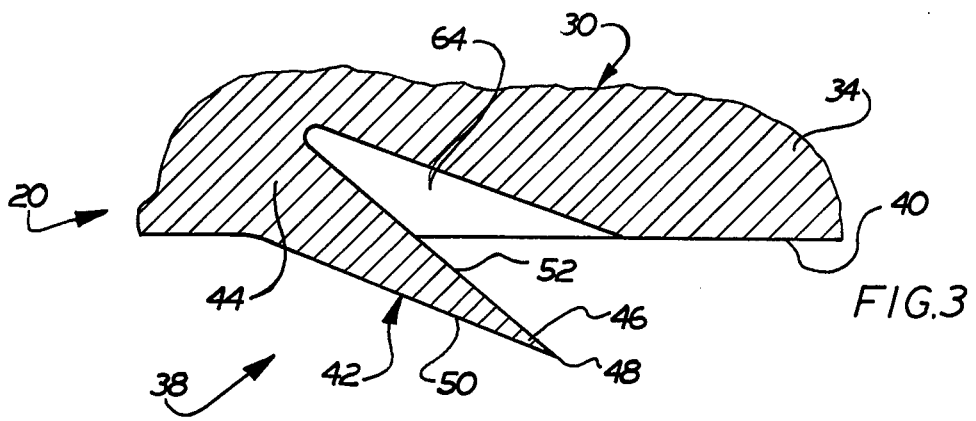
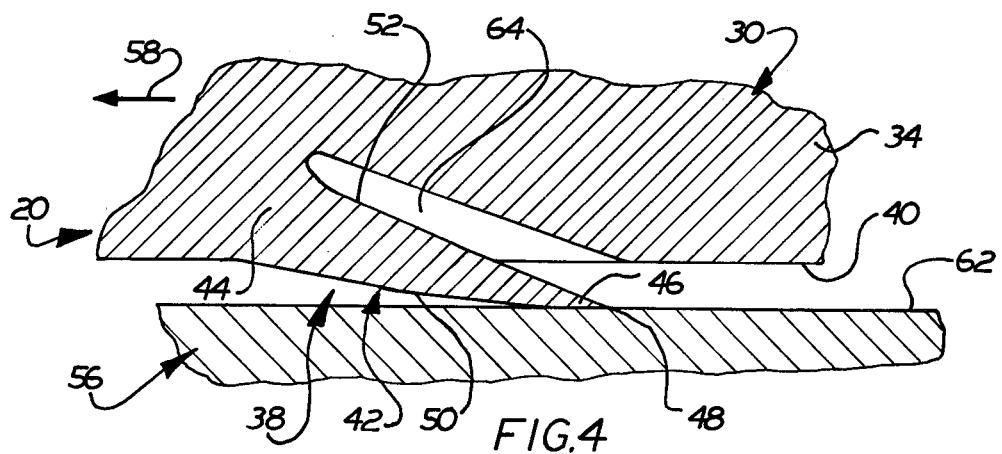

FASTENER

BACKGROUND OF THE INVENTION

This invention relates to a new and improved fastener having retaining elements to hold it against undesired movement relative to an associated member.

Threaded fasteners are frequently subjected to vibration and other forces tending to loosen the fastener. In order to prevent this from happening, various locking devices have been associated with fasteners to prevent them from becoming loose after they have been installed. Some of the prior art locking devices have taken the form of retainer elements which hold the fastener against rotational movement relative to a member once the fastener has been tightened. Fasteners having retainer elements to prevent undesired rotation of the fastener relative to a member are shown in U.S. Pat. Nos. 3,221,792; 2,779,376; 1,064,792; 986,510; 843,720; 827,562; and 80,034.

BRIEF SUMMARY OF THE INVENTION

The present invention relates to a threaded fastener which is utilized to apply force against a member and is provided with a retainer element to prevent undesired movement of the fastener relative to the member. In one embodiment of the invention, the retainer element is effective to prevent rotation of the fastener in a direction which would tend to loosen the fastener. This retainer element includes a resilient spring finger which is deflected inwardly as the fastener is tightened. The inward deflection of the spring finger prevents it from gouging or severely scratching an associated member as the fastener is tightened.

Upon rotation of the fastener in the opposite direction, that is in a direction tending to loosen the fastener, a free end portion of the spring finger penetrates the member and digs in to prevent continued rotational movement of the fastener. The greater the force tending to loosen the fastener, the greater the extent to which the spring finger digs into the member. This results in an increase in the locking action which prevents rotation of the fastener in a direction tending to loosen the fastener.

In another embodiment of the invention, the retainer element is effective to hold the fastener against both axial and rotational movement relative to an associated member. Although this embodiment of the invention could be utilized in many different environments, it is believed that it will be particularly advantageous in environments in which the fastener is relatively inaccessible while a threaded member is being connected with the fastener. The retainer element of the second embodiment includes a pair of spring fingers. When the fastener is pressed axially against an associated member, the free end portions of the spring fingers penetrate the associated member. As this occurs, arcuate cam surfaces on the spring fingers deflect them outwardly away from each other to securely hook the spring fingers into the associated member. This hooking action enables the spring fingers to hold the fastener against axial movement outwardly away from the member. In addition, the spring fingers are effective to hold the fastener against rotation in either a clockwise or counterclockwise direction relative to the member.

Accordingly, it is an object of this invention to provide a new and improved fastener having a retainer element which penetrates an associated member to retard undesired movement of the fastener relative to the member.

Another object of this invention is to provide a new and improved fastener having a retainer element which penetrates an associated member to hold the fastener against rotation upon initiation of rotation of the fastener in a direction which tends to loosen the fastener.

Another object of this invention is to provide a new and improved fastener having a retainer element which penetrates an associated member and is subsequently effective to hold the fastener against both axial and rotational movement relative to the member.

BRIEF DESCRIPTION OF THE DRAWINGS

The foregoing and other objects and features of the present invention will become more apparent upon a consideration of the following description taken in connection with the accompanying drawings wherein:

FIG. 1 is a fragmentary view of a fastener having retainer elements constructed in accordance with one embodiment of the present invention;

FIG. 2 is a plan view, taken generally along the line 2—2 of FIG. 1, illustrating the manner in which an array of retainer elements are disposed on the body of the fastener of FIG. 1;

FIG. 3 is an enlarged fragmentary sectional view further illustrating the construction of one of the retainer elements, the retainer element being shown in an extended condition;

FIG. 4 is a fragmentary sectional view, generally similar to FIG. 3, illustrating the fastener element in a partially retracted condition during rotational movement of the fastener element relative to an associated member;

DESCRIPTION OF SPECIFIC PREFERRED EMBODIMENTS OF THE INVENTION

Figure 5:
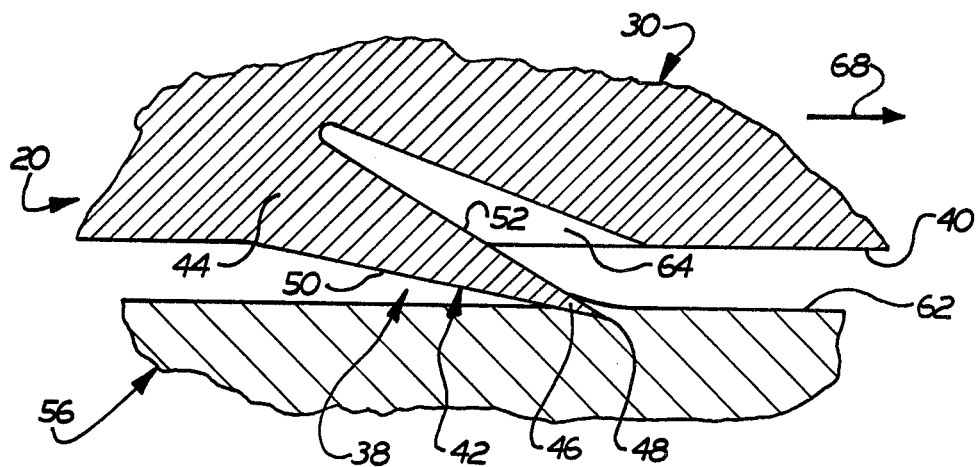
FIG. 5 is an enlarged fragmentary sectional view, generally similar to FIGS. 3 and 4, illustrating the manner in which the retainer element penetrates the associated member to prevent reverse rotation of the fastener element relative to the associated member.

An improved fastener 20 constructed in accordance with the present invention is illustrated in FIG. 1. The fastener 20 includes a head end portion 22 and an axially extending cylindrical shank 24 with external threads 26 which engage mating internal threads on an associated member (not shown). The head end portion 22 of the fastener includes a body 30 having wrenching flats 32 and a radially extending circular flange 34. In accordance with the present invention, a plurality of retainer elements 38 project outwardly from flat annular end face 40 of the flange 34. The retainer elements 38 are arranged in a circular array about the end face 40 in the manner shown in FIG. 2 of the drawings.

The retainer elements 38 cooperate with an associated member to prevent movement of the fastener 20 once it has been tightened to apply a force against the associated member. Each of the identical retainer elements 38 includes a resiliently deflectable spring finger 42 (FIG. 3) which is integrally formed with the flange 34 on the body 30 of the fastener. The spring finger 42 extends outwardly from the flat face surface 40 at an acute angle and tapers from a relatively large base end portion 44 (FIG. 3) to a free end portion 46. The free end portion 46 has a sharp point 48 formed by the intersection of flat inner and outer side surfaces 50 and 52.

When the fastener 20 is to apply a force against an associated member 56 (see FIG. 4), the fastener is rotated relative to the member in the direction of the arrow 58. As this occurs, the outer side surface 50 of the spring finger 42 presses against the flat side surface 62 of the member 56 to cam the spring finger 42 inwardly from the extended condition shown in FIG. 3 to a partially retracted condition shown in FIG. 4. It should be noted that during this rotational movement of the fastener 20 relative to the member 62, the free end portion 46 of the spring finger 42 slides along the flat outer side surface 62 of the member 56 and does not dig into the member.

As the spring finger 42 is resiliently deflected inwardly to the partially retracted condition of FIG. 4, the spring finger moves into a recess 64 formed in the flange 34. The recess 64 has a size and configuration which is the same as the size and configuration of the spring finger 42 so that the spring finger 42 can be fully retracted into the recess 64 as the fastener 20 is tightened. This enables the flat face surface 40 of the fastener to be utilized to apply a force against the member 56 once the fastener has been tightened. In addition, retraction of the spring finger 42 prevents the spring finger from gouging or severely scratching the surface 62 of the member 56.

As the fastener is tightened, the spring finger 42 cooperates with the member 56 to provide an axially outwardly directed force against the fastener 20. Thus, once the spring finger 42 is resiliently deflected from the extended condition of FIG. 3, the spring finger 42 is effective to apply a force against the member 56 tending to increase the space between the flat outer side surface 62 of the member and the flat face surface 40 of the fastener body 30 (see FIG. 4). The axially outwardly directed force against the fastener 20 tends to maintain the flanks of the external threads 26 on the fastener in tight abutting engagement with the flanks of the mating internal threads. This increases the frictional gripping action between the threads and thereby retards loosening of the fastener 20.

It is contemplated that once the fastener 20 has been connected, it may be subjected to vibrations or torque loading which tends to effect rotational movement of the fastener in a direction tending to loosen the fastener, that is in the direction indicated by the arrow 68 in FIG. 5. It should be noted that although for purposes of clarity of illustration, a space has been shown between the upper surface 62 of the member 56 and the flat side surface 40 and the fastener 20 in FIG. 5, the flat side surface 40 on the body 30 of the fastener 20 will be disposed in abutting engagement with the surface 62 of the member 56 when the fastener is fully tightened.

Upon initial movement of the fastener 20 through a very small distance in the direction of the arrow 68, the pointed free end portion 46 of the spring finger 42 penetrates the surface 62 of the member 56 and digs in as illustrated in FIG. 5. Thus, initiation of loosening movement of the fastener 20 causes the pointed end 46 of the spring finger to pierce the previously imperforate surface 62 of the member 56. The spring finger enters the member 56 through this opening under the influence of the force applied to the fastener 10.

As the spring finger 42 penetrates the member 56, a force is transmitted from the member to the body 30 of the fastener 20 to resist further rotational movement of the fastener relative to the member 56 in the direction of the arrow 68. This force is transmitted from the free end portion 46 of the spring finger 42 to the base 44 of the spring finger. The base 44 of the spring finger is integrally formed with the body 30 of the fastener. If the force tending to loosen the fastener should increase, the spring finger 42 will penetrate further into the member 56 with a resulting increase in the force resisting relative rotation between the member 56 and the body 30 of the fastener.

It should be noted that as the spring finger 42 penetrates into the member 56, the spring finger is pivoted about the base 44 from a retracted condition toward the extended condition of FIG. 3. This results in the spring finger being moved out of the recess 64 toward an angular orientation in which it is effective to dig further into the member 56 under the influence of forces tending to rotate the fastener in the direction of the arrow 68 in FIG. 5.

Figure 6:
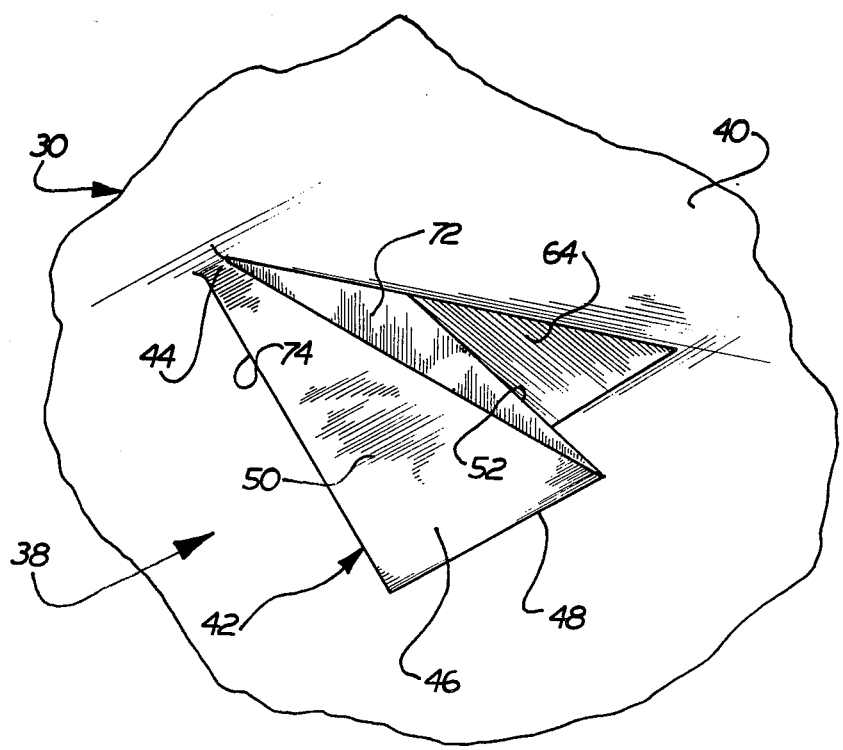
FIG. 6 is an enlarged fragmentary pictorial illustration of the retainer element of FIGS. 3–5.

It is contemplated that the spring finger 42 could have many different configurations. However in one specific preferred embodiment of the invention, the side surfaces 50 and 52 of the spring finger flare outwardly from the base 40 to provide a line of intersection between the two surfaces at the point 48 (see FIG. 6). This configuration of the spring finger results in a relatively large chisel-shaped point 48 on the free end portion 46 of the spring finger. This chisel-shaped point 48 results in the free end portion of the spring finger being relatively strong and enables the spring finger to penetrate the member 56 (see FIG. 5) along a relatively large line of engagement between the free end 46 of the spring finger and the member.

The base end portion 44 of the spring finger is relatively thick (see FIG. 5). Therefore, the base does not need a width which is as great as the width of the free end portion 46 of the spring finger. Accordingly, a pair of opposite side surfaces 72 and 74 of the spring finger 42 taper inwardly from the relatively wide free end portion 46 to the relatively narrow base 44 of the spring finger. By tapering the spring finger 42 outwardly from the base 44 to the relatively wide free end portion 46, the spring finger can be readily deflected resiliently inwardly from the retracted condition of FIG. 3 into the recess 64. If the width of the spring finger 42 was maintained constant from the free end portion 46 to the base 44, that is if the side surfaces 72 and 74 were parallel to each other, the spring finger 42 would have a relatively wide base and would be substantially stiffer.

Although it is contemplated that the spring finger 42 could be formed in many different ways, in one specific preferred embodiment of the invention the spring finger was formed with a die during a heading operation in which the body 30 of the fastener was formed. It should be noted that the recess 64 associated with the spring finger 42 provides material from which to form the spring finger 42 and thereby facilitates formation of the spring finger during the heading operation.

Although only one of the retainer elements 38 has been illustrated in FIGS. 3-6, the other retainer elements have the same construction and cooperate with the member 56 in the manner previously described. In addition, it should be understood that although the retainer elements 38 have been described in connection with a fastener having an external thread 26, that is a bolt, it is contemplated that the retainer elements could be utilized in association with a stationary and/or internally threaded fastener. In addition, it should be understood that the member 56 could be formed of many different materials as long as the spring finger 42 digs into the material of the member 56.

In the embodiment of the invention illustrated in FIGS. 1-6, the retainer elements 38 are effective to prevent rotation of the fastener 20 in a direction tending to loosen the fastener. In the embodiment of the invention illustrated in FIGS. 7-10, the fastener is provided with retainer elements which are capable of performing the functions of preventing axial movement of the fastener and of preventing rotational movement of the fastener in either direction relative to an associated member as disclosed. Since the embodiment of the invention illustrated in FIGS. 7-10 has many elements which correspond to the elements of the embodiment of the invention illustrated in FIGS. 1-6, similar numerals will be utilized to designate similar components, the suffix letter "a" being associated with the corresponding numerals of FIGS. 7-10 in order to avoid confusion.

The fastener 20a (see FIG. 7) has a head end portion 22a with an axially projecting cylindrical shank 24a on which an external thread 26a is formed. The head end portion 22a of the fastener 20a includes a body 30a having wrenching flats 32a and a circular flange 34a. A plurality of retainer elements 38a extend outwardly from a flat annular end face 40a of the flange 34a. The retainer elements 38a are disposed in a circular array about the cylindrical shank 24a of the fastener 20a (see FIG. 8).

In accordance with a feature of this embodiment of the invention, the retainer elements 38a are capable of performing the functions of holding the fastener 20a against axial movement relative to an associated member 56a (see FIGS. 9 and 10) and of holding the fastener against rotational movement in either a clockwise or counterclockwise direction relative to the member 56a. Although the fastener 20a could be used in many different environments, it is contemplated that the fastener 20a will be particularly advantageous in association with panels which, during the construction of an apparatus, become inaccessible on one side. The retainer elements 38a are utilized to connect the fastener 20a with the panel while the one side is still accessible.

Since the retainer elements 38a are effective to hold the fastener against both axial and rotational movement relative to the panel, the fastener is not easily dislodged from its position when a mating internal thread convolution is connected with the external thread convolution 28a on the fastener. Thus, axial loading can be applied by the internal threads on a mating fastener element without dislodging the fastener 20a from the panel. Similarly, the fastener 20a is held against rotational movement relative to the panel by rotational forces which are present during engagement of the external threads 26a with mating internal threads.

The retainer element 38a includes a pair of spring fingers 82 and 84 (FIG. 9) which extend outwardly from the flat annular face surface 40a of the body 30a of the fastener 20a. Spring fingers 82 and 84 have a base end portion 44a which is integrally formed with the body 30a of the fastener 20 and a free end portion 46a which terminates at a point 48a. In addition, each of the spring fingers 82 and 84 has an arcuate side or cam surface 50a which extends from the point 48a to the base 44a at the face surface 40a. Each of the spring fingers 82 and 84 is provided with a straight side surface 52a which is disposed in a plane which extends parallel to a longitudinal central axis of the fastener 20a and the cylindrical shank 24a.

Figure 8:
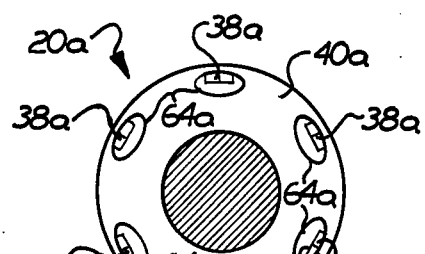
FIG. 8 is a plan view, taken generally along the line 8-8 of FIG. 7, and illustrating the relationship of an array of retainer elements to the body of the fastener of FIG. 7.
Figure 9:
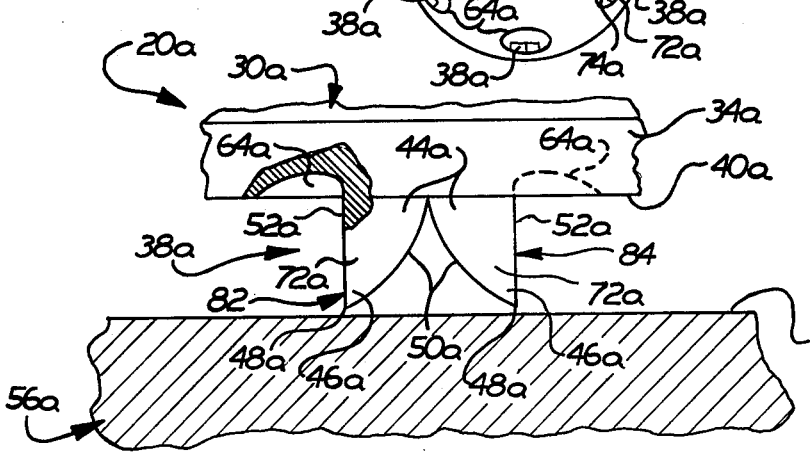
FIG. 9 is an enlarged fragmentary view illustrating the relationship of one of the retainer elements to an associated member immediately before engagement of the retainer element with the member.
Figure 10:
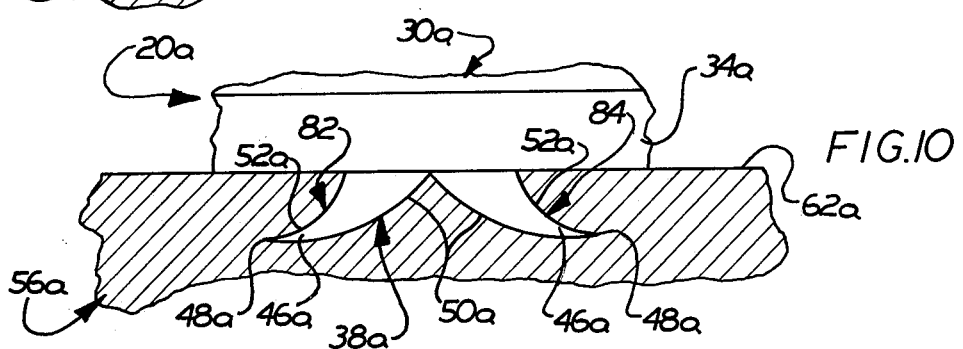
FIG. 10 is an enlarged fragmentary view, generally similar to FIG. 9, illustrating the manner in which the retainer element engages the associated member to hold the fastener against both axial and rotational movement relative to the associated member.

The sides 50a and 52a of the spring fingers 82 and 84 are interconnected by flat parallel side surfaces 72a (FIGS. 8 and 9) and 74a (FIG. 8). The flat side surfaces 72a of the spring fingers 82 and 84 are disposed in a co-planar relationship. The flat side surfaces 74a of the two spring fingers are also disposed in a co-planar relationship. The two flat side surfaces 72a and 74a of the spring fingers 82 and 84 extend perpendicular to the straight side surfaces 52a and extend parallel to the central axis of the fastener 20a.

When the fastener 20a is to be connected with the member 56a, the body 30a of the fastener is pressed against a flat outer side surface 62a of the member 56a. As this occurs, the points 48a on the leading end portions 46a of the spring fingers 82 and 84 penetrate the member 56a. During continued movement of the head end portion 22a of the fastener 20a toward the member 56a, the arcuate cam or side surfaces 50a cooperate with the material of the member 56a to apply sidewardly directed forces to the spring fingers 82 and 84. These forces cause the spring fingers 82 and 84 to separate or diverge to hook into the material of the member 56a in the manner shown in FIG. 10.

As the spring fingers 82 and 84 are forced into the member 56a, the arcuate side surfaces 50a of the spring fingers cooperate with the material of the member 56a to bend the spring fingers sideways and upwardly (as viewed in FIGS. 9 and 10) toward the body 30a of the fastener with a hooking action. This results in the straight side surfaces 52a of the spring fingers being bent so that material of the member 56a is trapped between the side surfaces 52a of the spring fingers and the body 30a of the fastener 20a. Once the spring fingers 82 and 84 have hooked into the material of the member 56a in the manner shown in FIG. 10, the spring fingers will resist any axial loading applied to the fastener 20a to hold the fastener in place on the member 56a.

In addition to preventing axial movement of the fastener 20a relative to the member 56a, the spring fingers 82 and 84 prevent rotational movement of the fastener in either a clockwise or counterclockwise direction. Thus, upon application of a torque tending to turn the fastener 20a toward the left (as viewed in FIG. 10), the spring finger 82 will prevent rotational movement of the fastener. Similarly, upon the application of a torque tending to turn the fastener 20a toward the right (as viewed in FIG. 10), the spring finger 84 will cooperate with the material of the member 56a to hold the fastener against rotational movement.

The spring fingers 82 and 84 may be formed in many different ways. However, it is preferred to form the spring fingers 82 and 84 during a heading operation in which the body 30a of the fastener 20a is formed. In order to provide material for forming the spring fingers 82 and 84, a recess 64a is provided in association with each of the retainer elements 38a (see FIGS. 8 and 9). In the embodiment of the invention illustrated in FIG. 8, the retainer elements 38a have been shown as being relatively close to the periphery of the flange 34a. To enable the retainer elements to be located close to the periphery of the flange, the recess 64a extends only part way around the retainer elements (see FIG. 8). By mounting the retainer elements close to the periphery of the rim of the flange, the torque resisting lever arm associated with each of the retainer elements 38a tends to be maximized. However, if desired, the retainer elements 38a could be located further inwardly from the periphery of the flange and the recess 64a could then circumscribe the associated retainer element.

Figure 7:
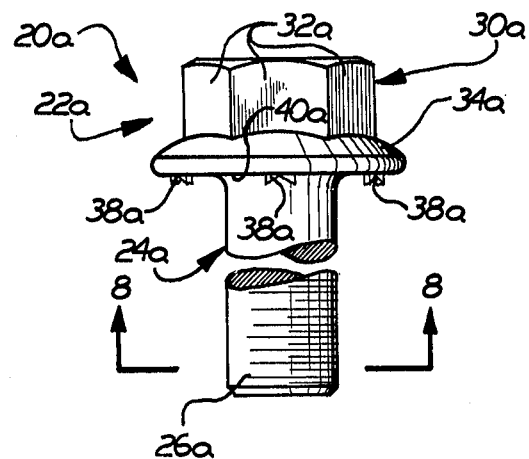
FIG. 7 is a fragmentary illustration of a fastener having retainer elements constructed in accordance with a second embodiment of the invention.

Although the retainer elements 38a have been illustrated in FIG. 7 in association with a fastener 20a having an external thread 26a, it is contemplated that the retainer elements 38a could be associated with a fastener having an internal thread. It should also be understood that the fastener 20a could be formed of any desired material so long as the spring fingers 82 and 84 could be resiliently deflected away from each other from the initial condition shown in FIG. 9 to the engaged condition shown in FIG. 10 under the influence of the material of the member 56a.

In view of the foregoing it is apparent that the present invention relates to a threaded fastener which is utilized to apply force against a member and is provided with a retainer element to prevent undesired movement of the fastener relative to the member. In one embodiment of the invention (FIGS. 1-6), the retainer element 36 is effective to prevent rotation of the fastener 20 in a direction which would tend to loosen the fastener. This retainer element 38 includes a resilient spring finger 42 which is deflected inwardly as the fastener is tightened. The inward deflection of the spring finger 42 prevents it from gouging or severely scratching an associated member 56 as the fastener is tightened.

Upon rotation of the fastener 20 in the opposite direction, that is in a direction tending to loosen the fastener, a free end portion 46 of the spring finger 42 penetrates the member 56 and digs in to prevent continued rotational movement of the fastener. The greater the force tending to loosen the fastener 20, the greater the extent to which the spring finger 42 digs into the member 56. This results in an increase in the locking action which prevents rotation of the fastener 20 in a direction tending to loosen the fastener.

In another embodiment of the invention (FIGS. 7-10), the retainer element 38a is effective to hold the fastener 20a against both axial and rotational movement relative to an associated member 56a. Although this embodiment of the invention could be utilized in many different environments, it is believed that it will be particularly advantageous in environments in which the fastener 20a is relatively inaccessible while a threaded member is being connected with the fastener. The retainer element 38a of the second embodiment includes a pair of spring fingers 82, 84. When the fastener 20a is pressed axially against an associated member 56a, the free end portions 46a of the spring fingers 82, 84 penetrate the associated member. As this occurs, arcuate cam surfaces 50a on the spring fingers 82, 84 deflect them outwardly away from each other to securely hook the spring fingers into the associated member. This hooking action enables the spring fingers 82, 84 to hold the fastener 20a against axial movement outwardly away from the member 56a. In addition, the spring fingers 82, 84 are effective to hold the fastener against rotation in either a clockwise or counterclockwise direction relative to the member.

Having described specific preferred embodiments of the invention, the following is claimed:

1. A fastener element for use in applying a force against a member, said fastener element comprising a body, thread means connected with said body for engaging a mating thread, said thread means cooperating with the mating thread during relative rotation between said body and the member in a first direction to urge said body toward the member to thereby tend to increase the force applied against the member, said thread means cooperating with the mating thread during relative rotation between said body and the member in a second direction to tend to decrease the force applied against the member, and retainer means connected with said body for retarding rotation between said body and the member in the second direction, said retainer means including a resiliently deflectable spring finger having a relatively narrow base portion which is integrally formed with said body and a relatively wide free end portion which penetrates the member under the influence of forces applied to said retainer means by said body upon initiation of rotation between said body and the member in the second direction, said spring finger including a first pair of side surfaces which extend transversely to each other and intersect at said free end portion of said spring finger, said first pair of side surfaces flaring outwardly from relatively narrow end portions at said base to relatively wide end portions which intersect at said free end portion of said spring finger, said spring finger further including a second pair of side surfaces which extend between said base and said free end portion of said spring finger and which intersect said first pair of side surfaces, said second pair of surfaces tapering outwardly from said base to sharp peaks at said free end portion of said spring finger.

2. A fastener element as set forth in claim 1 further including surface means for defining in said body a recess having a configuration which is the same as the configuration of said spring finger to enable said spring finger to move into the recess during rotation between said body and the member in the first direction.

* * * * *